US009673698B2

(12) United States Patent
Guo et al.

(10) Patent No.: US 9,673,698 B2
(45) Date of Patent: Jun. 6, 2017

(54) VOLTAGE REGULATOR WITH MULTIPLE OUTPUT RANGES

(71) Applicants: Li Guo, San Jose, CA (US); Guangbin Zhang, Cupertino, CA (US)

(72) Inventors: Li Guo, San Jose, CA (US); Guangbin Zhang, Cupertino, CA (US)

(73) Assignee: CISTA SYSTEM CORP., Grand Cayman (KY)

( * ) Notice: Subject to any disclaimer, the term of this patent is extended or adjusted under 35 U.S.C. 154(b) by 228 days.

(21) Appl. No.: 14/536,632

(22) Filed: Nov. 9, 2014

(65) Prior Publication Data

US 2015/0171749 A1     Jun. 18, 2015

Related U.S. Application Data

(60) Provisional application No. 61/916,008, filed on Dec. 13, 2013.

(51) Int. Cl.
*H02M 3/06*     (2006.01)
*G05F 1/618*    (2006.01)
*H02M 3/07*     (2006.01)

(52) U.S. Cl.
CPC .............. *H02M 3/06* (2013.01); *G05F 1/618* (2013.01); *H02M 2003/071* (2013.01)

(58) Field of Classification Search
CPC ...... G05F 1/10; H02M 3/03; H02M 2003/071
See application file for complete search history.

(56) References Cited

U.S. PATENT DOCUMENTS

| | | | | |
|---|---|---|---|---|
| 8,385,135 B2* | 2/2013 | Conte | ................... | G11C 5/145 323/311 |
| 2002/0118568 A1* | 8/2002 | Tanzawa | ................ | G11C 5/147 365/185.11 |
| 2008/0037301 A1* | 2/2008 | Fontana | ................. | G11C 5/145 363/59 |
| 2011/0018606 A1 | 1/2011 | Cassia | | |
| 2011/0193595 A1 | 8/2011 | Fukuda et al. | | |
| 2012/0218005 A1 | 8/2012 | Chua-Eoan et al. | | |
| 2013/0234688 A1* | 9/2013 | Sakaguchi | ......... | H03H 11/1213 323/282 |

FOREIGN PATENT DOCUMENTS

| CN | 101364119 A | 2/2009 |
|---|---|---|
| CN | 102270006 A | 12/2011 |

OTHER PUBLICATIONS

The first Chines Patent Office Action against CN 201410557295.2 mailed Dec. 1, 2015, and English translation of its summary.

\* cited by examiner

*Primary Examiner* — Charlie Y Peng
(74) *Attorney, Agent, or Firm* — Guosheng Wang; United States Research and Patent Firm

(57) ABSTRACT

The invention provides a voltage regulator with multiple output ranges. The voltage regulator includes a voltage divider that has at least a first resistor and a second resistor. The resistance ratio of the first resistor to the second resistor is 1:(X−1). The input of the regulator is connected to the first resistor, and the output is connected to the second resistor. A voltage source may provide a reference voltage Vref to a connecting point between the first resistor and the second resistor. At least one working circuit is connected to the output to provide the output voltage as Vout=Vin−X(Vin−Vref), wherein Vin is the input voltage. As another option, the at least one working circuit may be deactivated and the output may be coupled to ground.

16 Claims, 3 Drawing Sheets

VOLTAGE REGULATOR WITH MULTIPLE OUTPUT RANGES

CROSS-REFERENCE TO RELATED U.S. APPLICATIONS

This application claims the benefit of U.S. Provisional Patent Application No. 61/916,008, filed Dec. 13, 2013, which is incorporated herein by reference in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a solid state integrated circuit (IC), and more particularly, to a voltage regulator with multiple output ranges, and its use in various IC products such as a complementary metal oxide semiconductor (CMOS) image sensor.

BACKGROUND OF THE INVENTION

Modern electronic devices are generally built with various components for implementing multiple functions, and such components include, for example, logic circuitries operating at a low voltage and driver circuitries operating at a relative higher voltage. Even for driver circuitries, voltages at different levels may be required. As such, voltage regulators are widely used in modern electronic devices to regulate a supply voltage and to provide an output voltage at a given level. By way of example, a voltage regulator may be integrated in a CMOS image sensor to give out predetermined voltages. According to the output voltage, voltage regulators are generally classified as positive voltage regulator and negative voltage regulator.

Conventional linear voltage regulators, however, can provide only a single voltage output range, i.e., either positive or negative. Specifically, the positive voltage regulator can output only a positive voltage, and the negative voltage regulator can output only a negative voltage. As a result, manufacturers in the electronic industry have to prepare many different kinds of voltage regulators, in order to meet the needs in different applications.

Conventional negative voltage drivers typically employ a negative charge pump and a regulator. The regulator usually consists of an operational amplifier, large power MOS devices, and a resistor divider. For designs with a single output voltage range, people have no special concern about the current leakage. However, when the semiconductor device gets miniaturized and the threshold voltage of the MOS devices is decreased, the current leakage becomes a serious problem that deteriorates the performance of the electronic devices.

Therefore, there exists not only a need for a voltage regulator providing a plurality of output ranges, but also a need for a voltage regulator that can reduce or prevent the current leakage. Advantageously, the present invention can meet at least one of the above needs.

SUMMARY OF THE INVENTION

One aspect of the invention provides a voltage regulator that is capable of providing multiple output ranges, including negative, positive, and ground.

Another aspect of the invention provides a voltage regulator that can reduce or prevent the current leakage.

According to an exemplary embodiment, a voltage regulator having multiple output ranges is provided. The voltage regulator includes a voltage divider block, a negative charge pump block, and a pull down current source block. The negative charge pump block and the pull down current source block may be selectively activated to provide an output voltage in a negative or positive range. As another option, both the negative charge pump block and the pull down current source block may be deactivated to provide a ground output.

According to another exemplary embodiment of the invention, the voltage regulator may include an input configured to receive an input voltage Vin, and an output configured to provide an output voltage Vout. The voltage regulator may further include a voltage divider that has at least a first resistor and a second resistor. The resistance ratio of the first resistor to the second resistor is 1:(X−1), where X is also called as a ratio coefficient of the voltage divider. The input may be connected to the first resistor, and the output may be connected to the second resistor. A voltage source may provide a reference voltage Vref to a connecting point between the first resistor and the second resistor. In addition, the voltage regulator includes at least one working circuit connected to the output to provide the output voltage as Vout=Vin−X(Vin−Vref).

In a preferred embodiment, all the substrate of the NMOS devices included in the pull down current source is carefully connected to the lowest voltage level. Thus, current leakage may be prevented.

Still another aspect of the invention provides a CMOS image sensor comprising the above voltage regulator. In one embodiment, the voltage regulator used in the CMOS image sensor comprises (1) an input configured to receive an input voltage Vin; an output configured to provide an output voltage Vout; a voltage divider including at least a first resistor and a second resistor with a resistance ratio of 1:(X−1), the input being connected to the first resistor and the output being connected to the second resistor; a voltage source configured to provide a reference voltage Vref to a connecting point between the first resistor and the second resistor: and at least one working circuit connected to the output to provide the output voltage as Vout=Vin−X(Vin−Vref). In another embodiment, the voltage regulator used in the CMOS image sensor has multiple output ranges, and comprises a voltage divider including at least a first resistor and a second resistor connected in this order between an input and an output; a negative charge pump connected to the output; and a pull down current source connected to the output. The negative charge pump and the pull down current source are selectively activated to provide the multiple output ranges on the output.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form such as block diagrams in order to avoid unnecessarily obscuring the present invention. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, respective embodiments will be described in details by reference to the accompanying drawings. Incidentally, in all the drawings for describing the embodiments, the elements having the same function are given the same reference signs and numerals, and a repeated description thereon is omitted. Further, in the following embodiments, a description on the same or similar portions will not be repeated unless otherwise required.

Embodiments disclosed herein are related to a voltage regulator that is capable of providing a plurality of output ranges so as to meet various requirement for different voltage ranges with one simple solution. The plurality of output ranges may include a negative range, a positive range, and ground. Thus, the embodiments may provide flexibility for application of the voltage regulator in modern electronic devices. In addition, the voltage regulator may solve the problem of current leakage caused by reverse voltage connection of the NMOS substrate.

Figure 1:
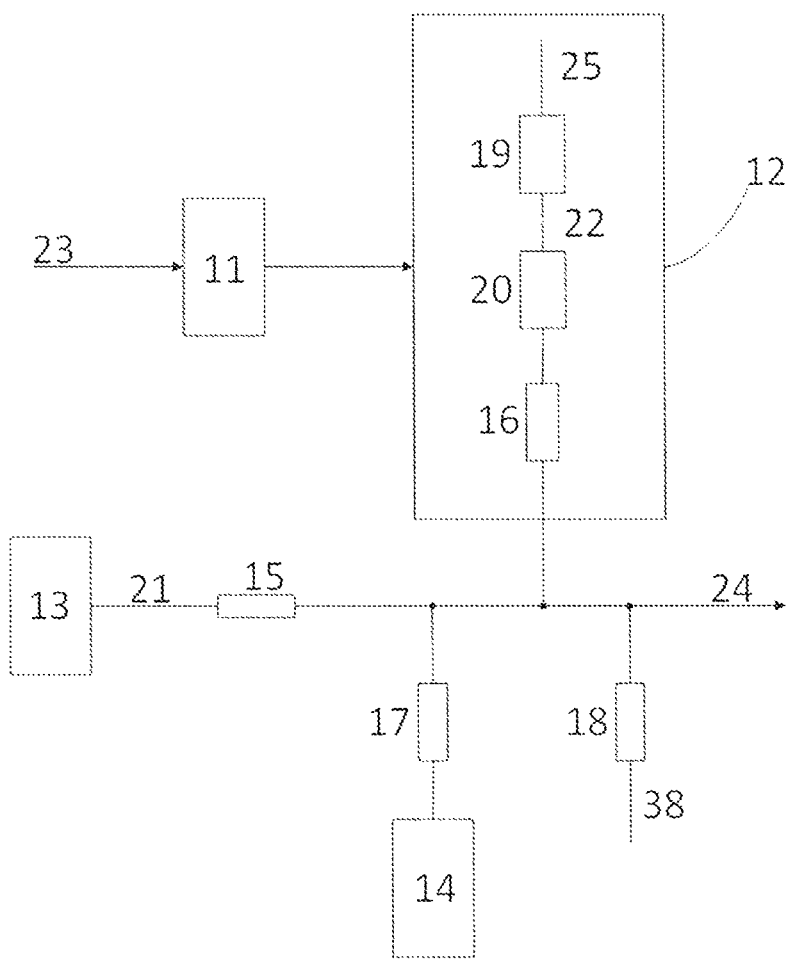
FIG. 1 is a block diagram showing a voltage regulator in accordance with an exemplary embodiment of the present invention.

FIG. 1 shows a block diagram of a voltage regulator 10 in accordance with an exemplary embodiment of the present invention. As shown, the voltage regulator 10 may include a voltage source block 11, a voltage divider block 12, a negative charge pump 13, and a pull-down current source block 14.

The voltage source 11 may provide a reference voltage to the voltage divider 12. In an example, the voltage source 11 may be a regulator which receives at its input 23 a reference voltage that may be generated from a reference voltage source (not shown). The regulator 11 may regulate and output to the voltage divider 12 a stabilized output voltage that is equal to the reference voltage received at the input 23. In a preferred embodiment, the regulator 11 may be a PMOS regulator, the structure of which will be described in details later.

The voltage divider 12, in an embodiment, may include a resistor divider that has a plurality of resistors connected in series, parallel or mixture thereof. By way of example, referring to FIG. 1, a resistor divider 12 includes two resistors, i.e., a first resistor 19, and a second resistor 20. The first resistor 19 and the second resistor 20 are connected in series. At the first resistor 19 side, the voltage divider 12 may receive an input voltage 25, and at the second resistor 20 side, the voltage divider 12 may provide an output voltage to the output terminal 24. For the purpose of illustration only, a second switch 16 may be connected between the voltage divider 12 and the output terminal 24 so as to switch on/off the output of the voltage divider 12 to the terminal 24.

The first resistor 19 may have a resistance $R0$, and the second resistor 20 may have a resistance $(X-1)R0$. Here, $X$ is also called as a ratio coefficient of the voltage divider 12. The output of the voltage source 11 may be connected to a connecting point 22 between the first resistor 19 and the second resistor 20. Thus, the voltage source 11 may enforce, or mandate, that the voltage at the connecting point 22 between the first resistor 19 and the second resistor 20 be the same as the reference voltage.

Further referring to FIG. 1, the negative charge pump 13 is connected to the output terminal 24. As known to a skilled person in the art, the negative charge pump may operate to provide a negative voltage. For the purpose of illustration only, a first switch 15 may be connected between the negative charge pump 13 and the output terminal 24 so as to switch on/off the negative voltage output from the negative charge pump 13 to the output terminal 24.

The pull down current source 14 is also connected to the output terminal 24. For the purpose of illustration only, a third switch 17 may be connected between the pull down current source 14 and the output terminal 24 so as to switch on/off the connection therebetween. In addition, the output terminal 24 may also be connected to a ground 38 via a fourth switch 18.

The operation of the voltage regulator 10 will be now described in details with regard to the plurality of output ranges on the output terminal 24, i.e., negative, positive and ground.

To have a negative output on the terminal 24, the first switch 15 and the second switch 16 may turn on, while the third switch 17 and the fourth switch 18 may turn off. So, the pull down current source 14 and the ground 38 may be disconnected from the output terminal 24.

As discussed above, the voltage source 11 can make sure that the voltage at the connecting point 22 between the first resistor 19 and the second resistor 20 is equal to the reference voltage V23. Thus, the output voltage V24, which is determined by the voltage divider 12 according to the input voltage V25, can be calculated from Equation 1: V24=V25–X(V25–V23).

The negative charge pump 13 operates to provide a negative voltage 21 to the output terminal 24. According to Equation 1, when the reference voltage V23 is less than (X–1)V25/X, it can ensure that the output voltage 24 be negative.

To have a positive output 24, the first switch 15 and the fourth switch 18 may turn off, while the second switch 16 and the third switch 17 may turn on. The pull down current source 14 may fulfill the resistor divider's function. Similar to the case for the negative output, the output voltage 24 can be derived from Equation 1. When the reference voltage V23 is greater than (X–1)V25/X, it can ensure that the output voltage 24 is in a positive range.

For a ground output 24, the first switch 15, the second switch 16 and the third switch 17 all turn off, and only the fourth switch 18 turns on. As a result, the output 24 is shorted to the ground 38.

The voltage regulator 10 has been described with reference to the block diagram shown in FIG. 1. It is to be understood by a skilled person in the art that the functional blocks described in FIG. 1 may be combined into a macro-block or separated into sub-blocks to implement the principles of the embodiments as described above, or even the embodiments may be implemented without one or more of the blocks as shown. Therefore, the description herein may support any possible combination or separation or further definition of the functional blocks described herein.

Figure 2:
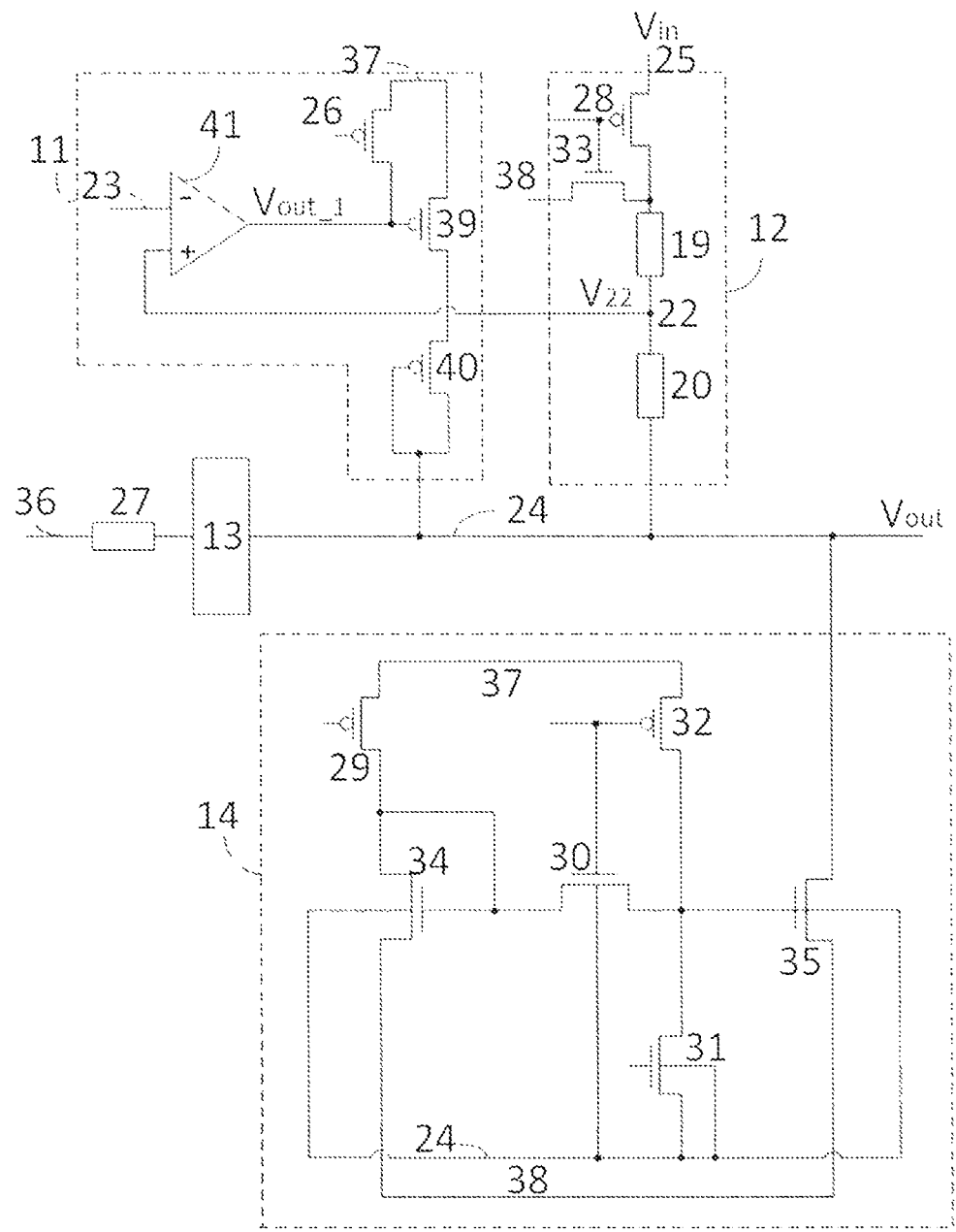
FIG. 2 depicts a circuit diagram of a voltage regulator in accordance with an exemplary embodiment of the present invention.

FIG. 2 shows a circuit diagram of the voltage regulator 10 in accordance with an exemplary embodiment of the present invention. The voltage regulator 10 also includes the voltage source block 11, the voltage divider block 12, the negative charge pump block 13, and the pull-down current source block 14.

Referring to FIG. 2, the voltage source 11 is shown as a PMOS regulator, which includes an operational amplifier 41 and a plurality of PMOS transistors 26, 39 and 40. The operational amplifier 41 may receive a reference voltage at its inverting input 23 and a feedback voltage at its positive input. The operational amplifier 41 has its output connected to a gate of a PMOS transistor 39. The source of the PMOS transistor 39 is connected to a high voltage (power supply) 37, and the drain of the PMOS transistor 39 is connected to an output terminal 24 via a diode-connected PMOS transistor 40 that has its gate shorted to the output terminal 24. In another example, the PMOS transistor 40 may be replaced with a resistor. In addition, a PMOS transistor 26 may be connected between the high voltage 37 and the gate of the PMOS transistor 39.

As discussed before, the voltage divider 12 may be implemented as a resistor divider that includes at least a first resistor 19 and a second resistor 20 connected in series. An end of the first resistor 19 opposite to the second resistor 20 may be connected to an input voltage 25 via a PMOS transistor 28 and to the ground 38 via a NMOS transistor 33. The PMOS transistor 28 and the NMOS transistor 33 may be controlled by a control signal that is provided to the gate of the PMOS transistor 28 and the NMOS transistor 33. In another embodiment, the switch 33 may be a PMOS transistor. In such an embodiment, a separate control signal is necessary for the PMOS transistor 33. An end of the second resistor 20 opposite to the first resistor 19 may be connected to the output terminal 24. The connecting point 22 between the first resistor 19 and the second resistor 20 may be connected to the positive input of the operational amplifier 41. Thus, the voltage at the connecting point 22 serves as the feedback voltage that is provided to the positive input of the operational amplifier 41.

The negative charge pump 13 is also connected to the output terminal 24. A clock signal 36, which may be generated from an oscillator or a timing controller (not shown), may be provided to the negative charge pump 13 through a switch 27 so as to control the operation of the negative charge pump 13. Since the specific structure of the negative charge pump 13 is well known, the description thereof will be omitted here for convenience and concision.

The pull down current source 14 may include PMOS transistors 29, 32 and NMOS transistors 30, 31, 34, 35. As shown in FIG. 2, the PMOS transistor 29 and the NMOS transistors 34, 35 may constitute a mirror current source. The PMOS transistor 32 and the NMOS transistor 31 are connected in this order between the high voltage 37 and the output terminal 24. The NMOS transistor 30 is connected between the gate of the NMOS transistor and a connecting point between the PMOS transistor 32 and the NMOS transistor 31. The gate of the PMOS transistor 32 and the NMOS transistor 30 may be controlled by a control signal. The connecting point between the PMOS transistor 32 and the NMOS transistor 31 is also connected to the gate of the NMOS transistor 35. In a preferred embodiment, the substrate of the NMOS transistors 30, 31, 34 and 35 are carefully connected electrically to the output terminal 24.

The operation of the voltage regulator 10 will now be discussed in further details with reference to FIG. 2 and Table 1 below. Table 1 summarizes the on/off status of respective switches with regard to the output voltage 24 in negative, positive and ground ranges.

TABLE 1

Status of switches for negative (–), positive (+) and ground (GND) output 24

| Switch | Output 24 | | |
|---|---|---|---|
| | Negative (–) | Positive (+) | Ground (GND) |
| 26(P) | Off | Off | On |
| 27 | On | Off | Off |
| 28(P) | On | On | Off |
| 29(P) | Off | On | Off |
| 30(N) | Off | On | Off |
| 31(N) | On | Off | Off |
| 32(P) | Off | Off | On |
| 33(N) | Off | Off | On |
| 34(N) | Off | On | Off |
| 35(N) | Off | Off | On |
| 39(P) | On | On | Off |
| 40(P) | On | On | On |

Referring to FIG. 2, in order to obtain a negative output voltage 24, the PMOS regulator 11, the voltage divider 12, and the negative charge pump 13 will be activated, while the pull down current source 14 will be deactivated.

The operation of the PMOS regulator 11 will be described first. Referring to FIG. 2 and Table 1, the operational amplifier 41 receives a reference voltage Vref at its inverting input 23 and a feedback voltage V22 at its positive input. The feedback voltage V22 is a voltage acquired from the connecting point 22 between the first resistor 19 and the second resistor 20. The PMOS transistor 26 turns off, and the PMOS transistor 39 operates in a saturation region. In such an embodiment, if the feedback voltage V22 is greater than the reference voltage Vref then the output voltage Vout_1 of the operational amplifier 41 will become greater, causing the current passing through the PMOS transistor 39 to become smaller and thus the current passing through the first resistor 19 getting higher. So, the voltage V22 at the connecting point 22 becomes smaller. On the other hand, if the feedback voltage V22 is smaller than the reference voltage Vref, then the output voltage Vout_1 of the operational amplifier 41 will become smaller, causing the current passing through the PMOS transistor 39 getting higher and thus the current passing through the first resistor 19 getting smaller. Thus, the voltage V22 at the connecting point 22 becomes higher. Eventually, the voltage V22 at the connecting point 22 between the first resistor 19 and the second resistor 20 is regulated to be equal to the reference voltage Vref.

As discussed above, the voltage V22 at the connecting point 22 between the first resistor 19 and the second resistor 20 is fixed to the reference voltage Vref. The PMOS transistor 28 turns on, and the NMOS transistor 33 turns off. The voltage divider 12 receives an input voltage Vin at the input terminal 25. According to Equation 1, the voltage Vout at the output terminal 24 is dictated by Vout=Vin-X(Vin-Vref). The negative charge pump 13 works to provide a negative voltage. When the reference voltage Vref is set to be less than (X-1)Vin/X, the output voltage Vout may be guaranteed to be in a negative range.

Please note that all the substrates of the NMOS transistors 30, 31, 34 and 35 are carefully connected to the output terminal 24, instead of ground. Thus, when the voltage on the output terminal 24 is in a negative range, it may also ensure that the substrate of these NMOS transistors is connected to the lowest voltage, and thus the current leakage may be prevented as the negative output is selected.

To obtain a positive output 24, the switch 27 turns off to stop the charge pump clock 36 being supplied to the negative charge pump 13. In such an embodiment, the output of the negative charge pump 13 is floating. In other words, the level of the pump 13 could be positive, negative or zero.

The PMOS transistor 29 turns on, and the NMOS transistor 34 generates a current reference. The NMOS transistor 35 mirrors the current reference by a size ratio between the NMOS transistor 34 and the NMOS transistor 35. Thus, the pull down current source 14 fulfills the voltage divider's function. Similar to the embodiment for negative output, the voltage Vout at the output terminal 24 is Vout=Vin-X(Vin-Vref). When the reference voltage Vref is set to be greater than (X-1)Vin/X, the output voltage Vout may be guaranteed to be in a positive range.

Please note that the switches 26, 28, 39 and 40 are formed of PMOS transistors. If NMOS devices are used for these switches 26, 28, 39 and 40, the voltage level of the substrate for these NMOS switches will not be the lowest in the design as a positive output 24 is selected, thereby leading to current leakage. By deploying PMOS transistors 26, 28, 39 and 40, current leakage is prevented for the positive output 24. Please also note that as discussed above, the switch 33 may also be formed of a PMOS transistor so as to prevent the current leakage.

In an example, the output voltage Vout may be set in a predetermined positive range so as to suppress the current leakage for the NMOS transistors. The positive output voltage Vout is preferably less than 1.8V, more preferably less than 1.0V, or even more preferably less than 0.5V. In a particular example, the positive output voltage Vout may be set at about 0.4V.

For the ground output 24, the PMOS transistor 26 turns on, and thereby the PMOS transistor 39 turns off. The PMOS transistor 28 turns off, and the NMOS transistor 33 turns on, thereby the resistor 19 is coupled to the ground 38. The PMOS transistor 29 turns off. The negative charge pump 13 is also deactivated.

The PMOS transistor 32 turns on and the NMOS transistor 30 turns off, thereby the gate of the NMOS transistor 35 is pulled up to the supply voltage 37. Then, the NMOS transistor 35 turns on, pulling down the output voltage 24 to the ground 38. Thus, a ground output 24 is provided.

The voltage regulator in the above embodiments may provide multiple output ranges, including negative range, positive range and ground. The reference voltage Vref, the input voltage Vin and the ratio coefficient X are programmable in the embodiments disclosed herein. Advantageously, the multiple output ranges can cover different processes and different applications. Thus, the voltage regulator may be applied flexibly, or in a controllable manner, in various electronic devices to meet different requirements.

In a typical example, the voltage regulator 10 may be used in a CMOS image sensor. The CMOS image sensor generally includes a plurality of decoders that require multiple high and low voltages to drive the pixels. The CMOS image sensor further includes logic circuits that operate in a low voltage domain which usually cannot drive the decoders. In addition, characterization of the CMOS image sensor also requires a wide range of voltages. The voltage regulator 10 may be deployed in the CMOS image sensor to provide the wide range of voltages as required to various components included within the CMOS image sensor. Since the voltage regulator 10 may provide a plurality of output ranges, silicon real-estate of the substrate may be utilized effectively. The present invention can also solve the inventory issues of maintaining too many different linear voltage regulators and charge pumps due to the drawback of single output range provided by the conventional regulators.

The voltage regulator of the present invention can further improve performance of various electronic devices, because, no matter the output range is positive or negative, the current leakage is effectively suppressed or prevented.

Figure 3:
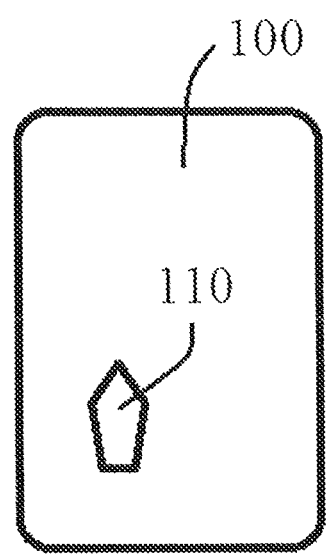
FIG. 3 is a block diagram illustrating a CMOS sensor comprising a voltage regulator of the invention.

FIG. 3 is a block diagram illustrating a CMOS sensor comprising a voltage regulator of the invention. With reference to FIG. 3, an image sensor 100 includes a voltage regulator 110 of the present invention. Examples of voltage regulator 110 may include, but are not limited to, those voltage regulators as shown in FIG. 1 and FIG. 2. Voltage regulator 110 can be coupled to, or integrated into, any suitable components in image sensor 100. For example, image sensor 100 may include components such as a complementary metal oxide semiconductor (CMOS) pixel array (not shown), a control circuitry (not shown), and a readout circuitry (not shown). The control circuitry, the readout circuitry, and the CMOS pixel array (including pixel circuitry) may be monolithically integrated on a single die or other substrate. A package for image sensor 100 may provide interconnections (not shown), such as pads, to connect image sensor 100 with an external signaling medium (e.g., circuitry of a digital camera or other system having the image sensor package).

The CMOS pixel array may include a two-dimensional array of CMOS pixels that are arranged in rows (e.g., rows R1 through Ry) and columns (e.g., column C1 through Cx). Commonly there may be anywhere from hundreds to many thousands each of rows and columns of pixels. During image acquisition, the pixels may acquire image data (e.g., photo-generated electrical charges). The image data from all of the pixels may be used to construct an image as is known in the art.

The control circuitry and the readout circuitry are coupled with the CMOS pixel array. The control circuitry is operable to apply electrical signals to the CMOS pixel array to control or assist with controlling aspects of image acquisition. The readout circuitry is operable to read out the image data from the pixels. Typically, the readout circuitry may read out image data from a single row of pixels at a time along column readout lines, which are also sometimes referred to as bitlines. The readout circuitry may potentially include amplification circuitry, analog-to-digital conversion (ADC) circuitry, gain control circuitry, or the like. Image data signals may be provided from the readout circuitry to an external signaling medium (e.g., circuitry of a digital camera or other systems having the image sensor package).

The CMOS pixel array commonly uses an electrical rolling shutter. During the image acquisition process, the CMOS pixel array may be exposed to constant and/or continuous light and the electrical rolling shutter may control the amount of exposure that the pixels of the CMOS pixel array are subjected to under the constant/continuous light. For example, in an electrical rolling shutter each row of pixels may be exposed to light during a different period of time in a rolling or sequential fashion. For example, for each acquired image the rows of pixels may be exposed to light sequentially row-by-row from the first row R1 to the last row Ry. Clock signals and rolling shutter image acquisition control signals may be provided to the control circuitry from an external signaling medium (e.g., circuitry of a digital camera or other systems having the image sensor package). The control circuitry may apply electrical signals to the CMOS pixel array based on the received clock and control signals to implement the electrical rolling shutter operations.

An example of CMOS pixel circuitry known to a skilled person in the art is four-transistor (4T) pixel (not shown). Each of the pixels includes a photodiode PD, a transfer transistor, a reset transistor, an amplifier or source-follower SF transistor, a row select transistor, and a floating diffusion node FD. Within each pixel, the photodiode is coupled to the floating diffusion node FD by the intervening transfer transistor. A transfer signal TX asserted on the gate of the transfer transistor activates the transfer transistor. The floating diffusion node FD may represent a circuit node to receive and hold a charge. The reset transistor is coupled between a supply voltage VDD and the floating diffusion node FD. A reset signal RST asserted on the gate of the reset transistor activates the reset transistor. The source-follower SF transistor is coupled between a voltage supply VDD and the row select transistor. The source-follower SF transistor has a gate coupled to the floating diffusion node FD and a channel selectively coupled to the column readout line through the row select transistor. The source-follower SF transistor is coupled to the column readout line when a row select signal SEL is asserted on the gate of the row select transistor. The row select transistor selectively couples the output of the pixel to the column readout line when the row select signal SEL is applied to the gate of the row select transistor.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A voltage regulator, comprising:
an input configured to receive an input voltage Vin;
an output configured to provide an output voltage Vout;
a voltage divider including at least a first resistor and a second resistor with a resistance ratio of 1 (X−1), the input being connected to the first resistor and the output being connected to the second resistor;
a voltage source configured to provide a reference voltage Vref to a connecting point between the first resistor and the second resistor; and
at least one working circuit directly connected to the output to provide the output voltage as Vout=Vin−X (Vin−Vref);
wherein the working circuit includes a pull down current source, and a negative charge pump configured to provide a negative voltage to the output.

2. The voltage regulator according to claim 1, wherein the output voltage Vout is in a negative range when the negative charge pump is activated to provide a negative voltage and the reference voltage Vref is less than (X−1)Vin/X.

3. The voltage regulator according to claim 1, wherein the output voltage Vout is in a positive range when the pull down current source is activated and the reference voltage Vref is greater than (X−1)Vin/X.

4. The voltage regulator according to claim 1, wherein the pull down current source includes a plurality of NMOS transistors, and the substrate of the plurality of NMOS transistors is directly connected to the output.

5. The voltage regulator according to claim 1, further comprising a switch connected between the output and a ground.

6. The voltage regulator according to claim 5, wherein the output voltage Vout is coupled to the ground when the voltage divider and the at least one working circuit are deactivated and the switch turns on.

7. The voltage regulator according to claim 1, wherein voltage source includes a PMOS regulator.

8. The voltage regulator according to claim 1, wherein the voltage divider includes at least one PMOS transistor connected between the first resistor and the input.

9. A voltage regulator with multiple output ranges, comprising:
a voltage source block;
a voltage divider including at least a first resistor and a second resistor connected in this order between an input and an output;
a negative charge pump directly connected to the output; and
a pull down current source directly connected to the output,
wherein the negative charge pump and the pull down current source are selectively activated to provide the multiple output ranges on the output.

10. The voltage regulator according to claim 9, wherein the output provides an output voltage Vout in a negative range when:
the input end is configured to receive an input voltage Vin;
a connecting point between the first resistor and the second resistor is set by a voltage source to a reference voltage Vref that is less than $(X-1)Vin/X$, where X is a ratio coefficient derived from the fact that the resistance ratio of the first and second resistors is 1 $(X-1)$, the negative charge pump is activated to provide a negative voltage; and the pull down current source is deactivated.

11. The voltage regulator according to claim 9, wherein the output provides an output voltage Vout in a positive range when:

the input is configured to receive an input voltage Vin;

a connecting point between the first resistor and the second resistor is set by a voltage source to a reference voltage Vref that is greater than $(X-1)Vin/X$, where X is a ratio coefficient derived from the fact that the resistance ratio of the first and second resistors is 1 $(X-1)$, the negative charge pump is deactivated; and the pull down current source is activated.

12. The voltage regulator according to claim 9, wherein the pull down current source includes a plurality of NMOS transistors that has a substrate directly connected to the output.

13. The voltage regulator according to claim 12, wherein one of the plurality of NMOS transistors is directly connected between the output and a ground.

14. The voltage regulator according to claim 13, wherein the output provides a ground voltage when:

the voltage divider, the negative charge pump, and the pull down current source are deactivated; and the NMOS transistor connected between the output and the ground turns on.

15. The voltage regulator according to claim 9, wherein the voltage divider further includes at least one PMOS transistor configured to switch on/off a voltage provided to the input; and wherein the negative charge pump includes a switch configured to switch on/off a clock signal provided to the negative charge pump.

16. A CMOS image sensor comprising a voltage regulator which comprises:

an input configured to receive an input voltage Vin;

an output configured to provide an output voltage Vout;

a voltage divider including at least a first resistor and a second resistor with a resistance ratio of 1 $(X-1)$, the input being connected to the first resistor and the output being connected to the second resistor;

a voltage source configured to provide a reference voltage Vref to a connecting point between the first resistor and the second resistor; and at least one working circuit directly connected to the output to provide the output voltage as Vout=Vin−X (Vin−Vref);

wherein the working circuit comprises a negative charge pump directly connected to the output, and a pull down current source directly connected to the output.

* * * * *